(12) United States Patent
Young et al.

(10) Patent No.: US 6,574,199 B1
(45) Date of Patent: *Jun. 3, 2003

(54) UNIFYING SLOT ASSIGNMENT PROTOCOL LOGICAL NEIGHBORHOODING

(75) Inventors: C. David Young, Plano, TX (US); James A. Stevens, Allen, TX (US); Roy W. Krueger, Bedford, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/303,526

(22) Filed: Apr. 30, 1999

(51) Int. Cl.$^7$ .............................................. H04L 12/28
(52) U.S. Cl. ...................... 370/254; 370/330; 370/337; 370/443
(58) Field of Search ................................. 370/337, 227, 370/443, 254, 390, 356, 248, 329, 330, 255; 375/202; 455/556; 340/539

(56) References Cited

U.S. PATENT DOCUMENTS

| | | | | |
|---|---|---|---|---|
| 5,117,422 A | * | 5/1992 | Hauptschein et al. | 370/255 |
| 5,719,868 A | | 2/1998 | Young | 370/436 |
| 5,949,760 A | * | 9/1999 | Stevens et al. | 370/254 |
| 6,317,436 B1 | * | 11/2001 | Young et al. | 370/443 |
| 6,331,973 B1 | * | 12/2001 | Young et al. | 370/337 |

OTHER PUBLICATIONS

"Bridging the Gap Interoperability, Survivability, Security" Lawrence Pond and Victor O. K. Li, 1989 IEEE Military Communications Conference, Conference Record, vol. 1 of 3.

IEEE Transaction On Information Theory, vol. IT–30, No. 4, Jul. 1984.

"Soldier Phone: An Innovative Approach to Wireless Multimedia Communications", Bittle, Caples, Young, IEEE Military Communications Conference, Milcom 98, vol. 3.

"A Hybrid Distributed Slot Assignment TDMA Channel Access Protocol" Sunlin, IEEE Military Communications Conference, 1990, vol. 3 of 3.

"USAP: A Unifying Dynamic Distributed Multichannel TDMA Slot Assignment Protocol" Young, Milcom 96 Conference Proceedings, vol. 1 of 3.

"Clique activation Multiple Access (CAMA): A Distributed Heuristic for Building Wireless Datagram Networks" C. D. Young and J. Stevens, IEEE Military Communications Conference, 1998, vol. 1.

* cited by examiner

Primary Examiner—Hassan Kizou
Assistant Examiner—John Pezzlo
(74) Attorney, Agent, or Firm—Nathan O. Jensen; Kyle Eppele

(57) ABSTRACT

A heuristic logical neighborhooding technique is applied to dynamic wireless networking. Logical neighborhooding, provides for the formation of logical neighborhoods across a plurality of channels when such need arises due to increased network density. The technique utilizes a time division multiple access structure including bootstrap slots, broadcast slots, and traffic slots.

22 Claims, 2 Drawing Sheets

UNIFYING SLOT ASSIGNMENT PROTOCOL LOGICAL NEIGHBORHOODING

FIELD OF THE INVENTION

The present invention relates to network communications. More particularly the present invention relates to self-organizing wireless networks applying a logical neighborhooding technique to adjust to the network density.

BACKGROUND OF THE INVENTION

Mobile multi-hop broadcast packet radio networks are known for their rapid and convenient deployment, self organization, mobility, and survivability. In this type of network as illustrated in FIG. 2, a transmission from one node, for example node 1, is broadcast to all nodes in its "neighborhood". Ultra-high frequency (UHF) systems generally have a neighborhood defined by nodes within line of sight of the transmitting node (these nodes being termed within one "hop" of the transmitting node). For example, in FIG. 2 nodes 1, 3, 4, 5, 6, 7, and 8 make up one neighborhood. For data transmitted from node 1 to propagate multiple hops, the data must be relayed by one or more of node 1's neighbors. For example, node "a" (likewise nodes b, c, and g) is two hops away from the node 1 transmitter. The data will be relayed in this manner until it has arrived at all intended destination nodes.

Since there are generally limitations on the number of simultaneous transmissions that a receiver can successfully process (typically one), collisions can be avoided by the assignment of time slots in which individual nodes can transmit. There are many approaches to deciding which nodes are assigned which slots, and the approach is generally driven by the network applications, such as, broadcast, multicast, unicast, datagrams, virtual circuits, etc. Because the problem of optimally assigning slots in this environment is mathematically intractable, a heuristic approach is taken to design an integrated protocol that both chooses the number of slots to assign to each neighboring node and coordinates their activation in the network.

Tactical military and commercial applications require self-organizing, wireless networks that can operate in dynamic environments and provide peer-to-peer, multi-hop, multi-media communications. Key to this technology is the ability of neighboring nodes to transmit without interference. Neighboring nodes transmit without interference by choosing time slots and channels that do not cause collisions at the intended unicast or multicast receivers. This functionality is provided by the Unifying Slot Assignment Protocol (USAP) which is disclosed in U.S. Pat. No. 5,719,868 and which is herein incorporated by reference. The function of USAP is to monitor the RF environment and allocate the channel resources on demand and automatically detect and resolve contention resulting from changes in connectivity.

One of the many tradeoffs that designers of such networks must make is maximizing network size and density in the face of limited channel resources. The challenge is to find methodologies which maintain the desirable network characteristics while providing organization of nodes with respect to densely and sparsely populated portions of the network. These methodologies typically require significant overhead, including computational costs or large storage and transmission requirements.

Thus, there is a need and desire for a heuristic procedure that uses minimal overhead to implement the channel resource allocation to establish a broadcast channel for datagram and control traffic and point-to-point links for higher throughput or delay sensitive traffic. Further, there is a need and desire for a heuristic method that uses a very small packet transmitted on a common channel that both initializes the network and contains slot allocations for network operations. Further still, there is a need and desire for a heuristic technique that separates nodes in densely populated areas into logical neighborhoods that, although managed separately, can be bridged for sharing critical network information and user traffic.

SUMMARY OF THE INVENTION

The present invention relates to a method for automatically managing the communication channel resources between two nodes having neighboring nodes in a network of transceiver nodes. Each node communicates during specific time slots and uses multiple frequencies on a time multiplex basis. The method includes storing possible communication time slots and frequencies between nodes in the network at each node. The method further includes announcing and transmitting from a first node during a specific time slot, a specific transmit slot and frequency and the identification of a second node to all neighboring nodes of the first node comprising a first set of neighboring nodes. The method still further includes transmitting from the first node a control packet containing transmit and receive information of the first node and the first set of neighboring nodes and identifying the announced selected transmit slot and frequency in the first set of neighboring nodes. The announced selected transmit slot and frequency is used to establish substantially contention free communication on the selected transmit slot and frequency between the first and second nodes. Further still, the method includes adapting to the transceiver node network density by utilizing logical neighborhooding.

The present invention relates to a communication network including a network of transceiver nodes, each node having neighbors, utilizing a time division multiple access structure the time division multiple access structure has bootstrap slots, broadcast slots, and traffic slots. Each node includes a boot manager having a logical neighborhooding protocol. Each node also includes a slot assignment protocol that chooses the number of slots to assign to each neighboring node and coordinates the activation of the slots for the neighboring nodes. Each node further includes a slot allocation storage, communicating with the slot assignment protocol, and a channel access communicating with the boot manager.

The present invention still further relates to a method of automatically managing the communication channel resources between two nodes having neighboring nodes in a network of transceiver nodes, wherein each node communicates during specific time slots and uses multiple frequencies on a time multiplex basis. The method includes storing possible communication time slots and frequencies between nodes in the network of each node. The method further includes announcing and transmitting from a first node during a specific time slot, a specific transmit slot and frequency and the identification of a second node to all neighboring nodes of the first node comprising a first set of neighboring nodes. The method still further includes transmitting from the first node a control packet containing transmit and receive information of the first node and the first set of neighboring nodes. The method still further includes and identifying the announced selected transmit slot and frequency in the first set of neighboring nodes and adapting to the transceiver node network density by creating logical neighborhoods over a plurality of frequencies when the network density exceeds a predetermined limit.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE PREFERRED EMBODIMENTS

1. TDMA Structure

Figure 1:
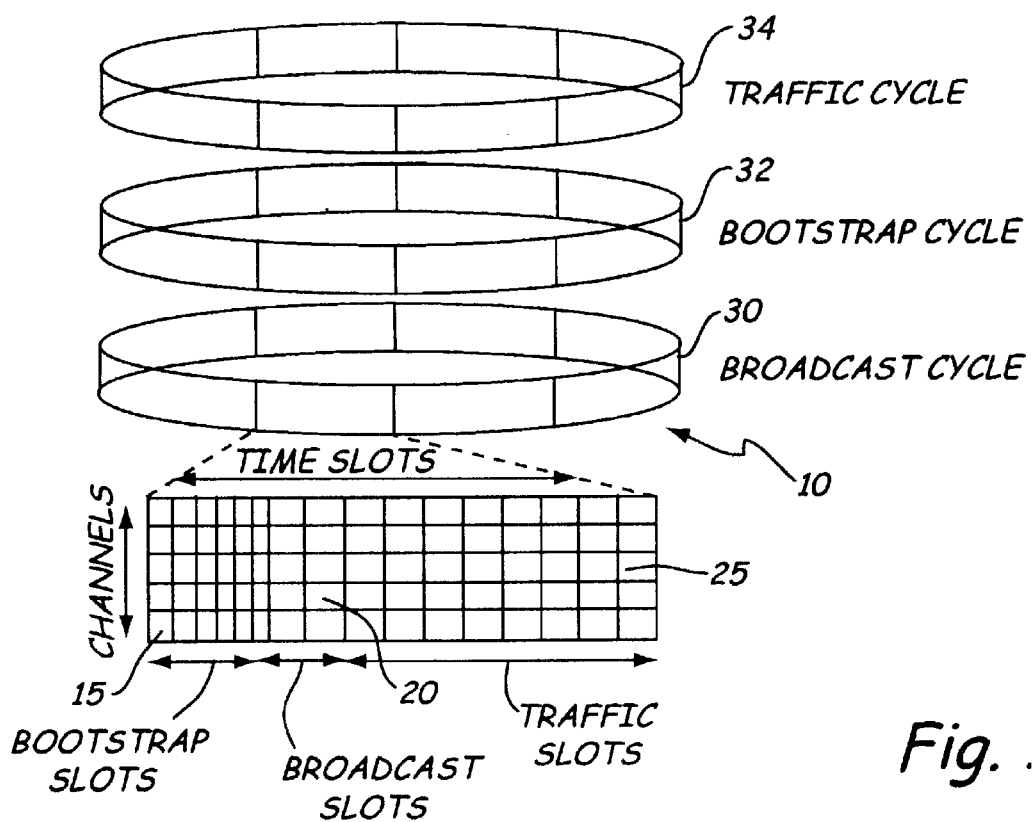
FIG. 1 is a diagram illustrating a time division multiple access structure utilized with the present invention.

USAP Logical Neighborhooding (USAP-LN) has a Time Division Multiple Access (TDMA) structure 10, depicted in FIG. 1, consisting of three types of time slots (bootstrap slots 15, broadcast slots 20, and traffic slots 25). USAP-LN makes efficient use of these slots, which helps make efficient use of network resources. The TDMA structure depicted in FIG. 1, illustrates a preferred embodiment of the present invention having the network parameters provided in Table 1, however other structures having different arrangements, numbers, order, and duration of slots can be used without departing from the spirit and scope of the present invention.

TABLE 1

Network Parameters used for TDMA Structure depicted in FIG. 1

| Parameter | Value |
|---|---|
| Frames per second | 8 |
| Bootstrap slots | 6 per frame |
| Broadcast slots | 2 per frame per channel |
| Traffic slots | 8 per frame per channel |
| Traffic cycle | 1 frame |
| Broadcast cycle | 4 frames |
| Bootstrap cycle | 2 frames |
| RF Channels | 5 |

Bootstrap slots 15 contain the minimum information necessary to bring the network up to operational status. In a preferred embodiment, two of the user traffic slots are reserved for broadcasting, and are therefore called the "broadcast slots". The broadcast slots can be assigned over F frames, also known as the "broadcast cycle" 30 (i.e., F is the number of frames that make up a broadcast cycle). Broadcast cycle 30 runs simultaneously with a bootstrap cycle 32 and a traffic cycle 34. In a preferred embodiment, up to 2*F neighbors can transmit every broadcast cycle to share net management information (NMOPs, directory service, routing, etc.) and occasional user datagrams with their immediate neighbors, however other numbers of neighbors can be accommodated provided with different heuristics.

2. Slot Assignment

Figure 2:
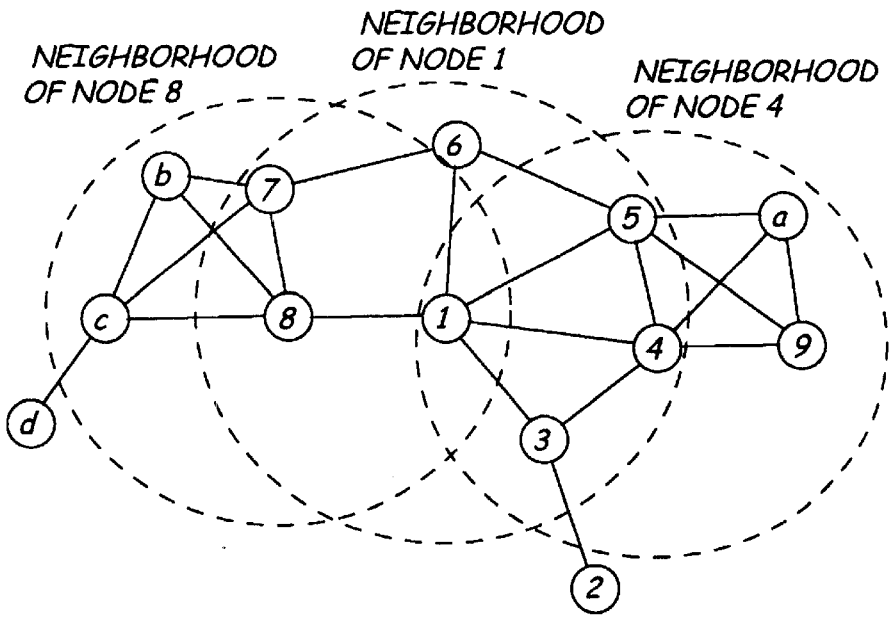
FIG. 2 is a general diagram of a network including nodes.

Bootstrap slots 15 contain all the information needed by USAP to assign both broadcast 20 and traffic slots 25. Referring now to FIG. 2, a network with the "neighborhoods" for nodes one, four, and eight circled by a dotted line is depicted. USAP allows a transmitter to choose one or more slots from the pool of unassigned slots in its neighborhood, coordinate the announcement and confirmation of the assignment with the neighboring nodes up to two hops away, and detect and resolve conflicting assignments that result from unfortunate timing and the mobility of the nodes.

USAP can form the foundation of many types of dynamic TDMA architectures by providing common support for different higher level heuristics, hence the term "unifying". The TDMA schedule established by USAP is contention-free, all conflicts are detected and resolved, and no livelock can occur.

The information used by USAP to determine slot assignments is called the "assigned slots record", or ASR. The ASR consists of two bitmaps. The "broadcast bitmap" is used to perform node activation on the broadcast slots; the "traffic bitmap" is used to perform simultaneous node, link, multicast, and clique activations on the traffic slots. Table 2 shows the structure of the ASR.

TABLE 2

Assigned Slots Record Structure

| Information | Size | Values |
|---|---|---|
| neighborhood | 2 bits | channel numbers 0–4 |
| conflict resolution | 6 bits | 0–62 Node ID |
| | | 63 no conflict |
| traffic bitmap | S*C*2 bits | 0: unassigned |
| | | 1: self transmit |
| | | 2: self receive |
| | | 3: neighbor transmit or conflict |
| broadcast bitmap | B*F*2 bits | 0: unassigned |
| | | 1: self transmit |
| | | 2: self receive |
| | | 3: conflict |
| four Rxers Ids | 24 bits (6 bits each) | 0–62 Node ID |
| | | 63 Broadcast |

It assumes that there are C channels, S traffic slots, and B broadcast slots. Notice that the ASR is a more efficient encoding of the information that USAP stores in the STi, SRi, and NTi assigned slot sets (see, e.g., U.S. Pat. No. 5,719,868). USAP regenerates the sets from the ASR.

3. Node Activation

Node activation can effectively make use of only a single channel at a time. Thus in a preferred embodiment, when the density of a neighborhood is greater than 2*F, some nodes will be unable to reserve a broadcast slot on the primary channel. Until slots become available on the primary channel, these nodes can assign themselves slots on a secondary channel. If no secondary channel slots are available, a tertiary channel can be used, and so on. In this way, as network density increases, independently managed neighborhoods are formed. This process is termed "Logical Neighborhooding". The only tie that one "managed neighborhood" has with another is the ASR, which allows USAP to coordinate consistent slots assignments over a shared channel. However, it would be possible to assign traffic slots between different managed neighborhoods via the ASR, allowing these neighborhoods to communicate with each other in a degraded mode.

Figure 3:
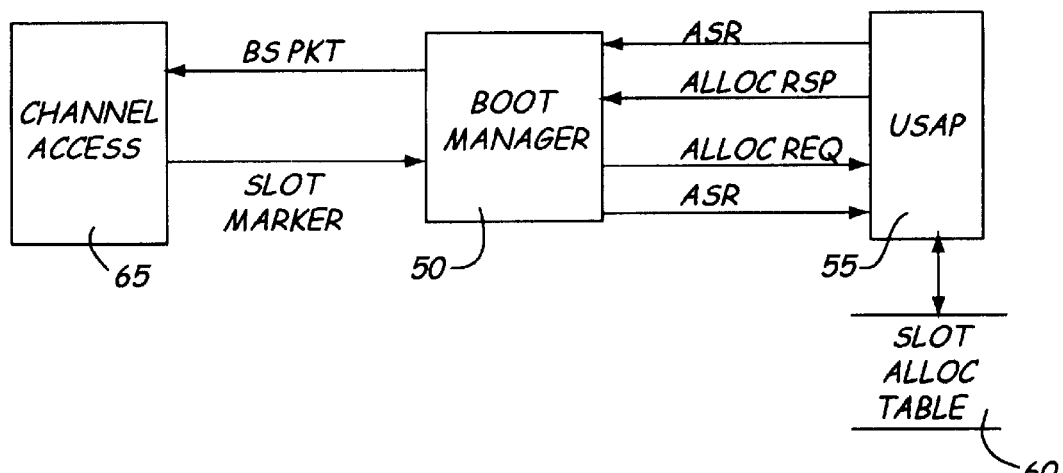
FIG. 3 is a generalized block diagram depicting information flow within a transceiver node using USAP Logical Neighborhooding.

Referring now to FIG. 3, node allocation is managed by a Boot Manager 50. Boot Manager 50 passes broadcast packets to a channel access 65 and receives slot markers from channel access 65. The node allocation process consists of the following steps:

1. when it is time for a node to transmit in its bootstrap slot, it retrieves its current assigned slot sets, in ASR format, from USAP 55;
2. Boot Manager 50 passes the ASR information, as it is received from each neighbor, to USAP 55;
3. if a node allocation slot is not already assigned, Boot Manager 50 asks USAP 55 to choose a node allocation slot on the desired channel (primary, secondary, etc.) that is consistent with its current assigned slot sets; and
4. if step 3 is successful, USAP 55 will pass back a handle to that assignment and update a Slot Allocation Table 60; however, if USAP 55 detects a conflict, it will erase the allocation from the table.

Once Slot Allocation Table 60 has the broadcast slot, net switching starts accepting cells to be transmitted in that slot. Otherwise, any cells intended for the broadcast slots are thrown away. It is up to another, possibly parallel, protocol layer to implement a broadcast protocol or reliable datagram service utilizing the broadcast slots.

USAP Logical Neighborhooding provides a new and much more efficient approach to utilize multiple RF channels, as well as addressing interference issues. It provides a multi-functional packet, the bootstrap, that both initializes the network and contains slot allocations for network operations. USAP-LN can handle simultaneous link, node, multicast, and clique activations in the same traffic area. USAP-LN allows nodes in densely populated areas to separate themselves into logical, managed neighborhoods over multiple channels. Finally, by using traffic slots to pass inter-neighborhood management information, these separate neighborhoods can be united to form larger networks.

It is understood that while the detailed drawings and examples given described preferred exemplary embodiments of the present invention, they are for the purposes of illustration only. The method and apparatus of the invention is not limited to the precise details and conditions disclosed. For example, it is not limited to the specific time frame and time slot lengths, or to the number of cycles described. Various changes may be made to the details disclosed without departing from the scope and spirit of the invention, which is defined by the following claims.

What is claimed is:

1. A method for automatically managing the communication channel resources between two nodes having neighboring nodes in a network of transceiver nodes, wherein each node communicates during specific time slots and uses multiple frequencies on a time multiplex basis, the method comprising:
    storing possible communication time slots and frequencies between nodes in the network at each node;
    announcing and transmitting from a first node during a specific time slot, a specific transmit slot and frequency and the identification of a second node to all neighboring nodes of the first node comprising a first set of neighboring nodes;
    transmitting from the first node a control packet containing transmit and receive information of the first node and the first set of neighboring nodes;
    identifying in the first set of neighboring nodes the announced selected transmit slot and frequency used to establish substantially contention free communication on the selected transmit slot and frequency between the first and second nodes; and
    adapting to the transceiver node network density by utilizing logical neighborhooding.
2. The method of claim 1 wherein logical neighborhooding is used when the number of nodes in a neighborhood is greater than the number of time slots in a broadcast cycle.
3. The method of claim 1 wherein time slots are assigned first on a primary channel.
4. The method of claim 3 wherein time slots are assigned on a secondary channel when no slots are available on the primary channel.
5. The method of claim 1 wherein the network of transceiver nodes is divided into a plurality of neighborhoods, each neighborhood substantially communicating on a separate channel.
6. The method of claim 1 wherein substantially contention free access is maintained by a unifying slot assignment protocol (USAP).
7. The method of claim 1 wherein the possible communication time slots and frequencies are stored in assigned slot records (ASR).
8. The method of claim 7 wherein substantially contention free access is maintained by a unifying slot assignment protocol (USAP).
9. The method of claim 8 wherein the USAP utilizes the information stored in the ASR.
10. The method of claim 8 wherein the USAP coordinates consistent slot assignments between logical neighborhoods.
11. The method of claim 10 wherein the USAP is used to establish communication between the logical neighborhoods.
12. A communication network comprising:
    a network of transceiver nodes, each node having neighbors, utilizing a time division multiple access structure, the time division multiple access structure having broadcast slots, and traffic slots, and each node including,
        a boot manager, including a logical neighborhooding protocol;
        a slot assignment protocol that chooses the number of slots to assign to each neighboring node and coordinates the activation of the slots for the neighboring nodes;
        a slot allocation storage, communicating with the slot assignment protocol; and
        a channel access communicating with the boot manager.
13. The communication network of claim 12 wherein the time division multiple access structure includes bootstrap slots.
14. The communication network of claim 12 wherein the boot manager handles the node allocation process.
15. The communication network of claim 12 wherein the logical neighborhooding protocol produces a plurality of logical neighborhoods, each logical neighborhood being on a separate channel.
16. The communication network of claim 12 wherein the slot assignment receives information from the boot manager in an assigned slot records (ASR) format.
17. The communication network of claim 12 wherein the boot manager creates logical neighborhoods when the number of nodes in a neighborhood exceeds twice the number of frames in a broadcast cycle.
18. A method of automatically managing the communication channel resources between two nodes having neighboring nodes in a network of transceiver nodes, wherein each node communicates during specific time slots and uses multiple frequencies on a time multiplex basis, the method comprising:

storing possible communication time slots and frequencies between nodes in the network of each node;

announcing and transmitting from a first node during a specific time slot, a specific transmit slot and frequency and the identification of a second node to all neighboring nodes of the first node comprising a first set of neighboring nodes;

transmitting from the first node a control packet containing transmit and receive information of the first node and the first set of neighboring nodes;

identifying in the first set of neighboring nodes the announced selected transmit slot and frequency used to establish substantially contention free communication on the selected transmit slot and frequency between the first and second nodes; and adapting to the transceiver node network density by creating logical neighborhoods over a plurality of frequencies when the network density exceeds a predetermined limit.

19. The method of claim 18 wherein the predetermined limit is the number of time slots in a broadcast cycle.

20. The method of claim 18 wherein the time slots are assigned first on a primary channel.

21. The method of claim 18 wherein the slots are assigned in subsequent channels when no slots are available on preceding channels.

22. The method of claim 18 wherein substantially contention free access is maintained by a unifying slot assignment protocol (USAP).

* * * * *